UNITED STATES PATENT OFFICE.

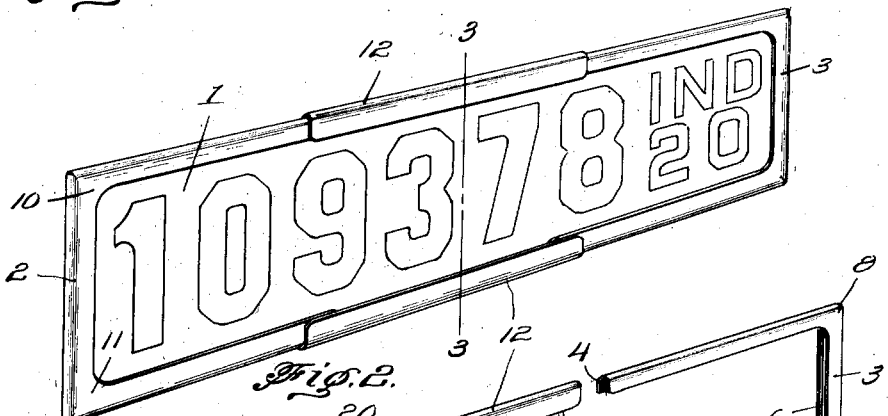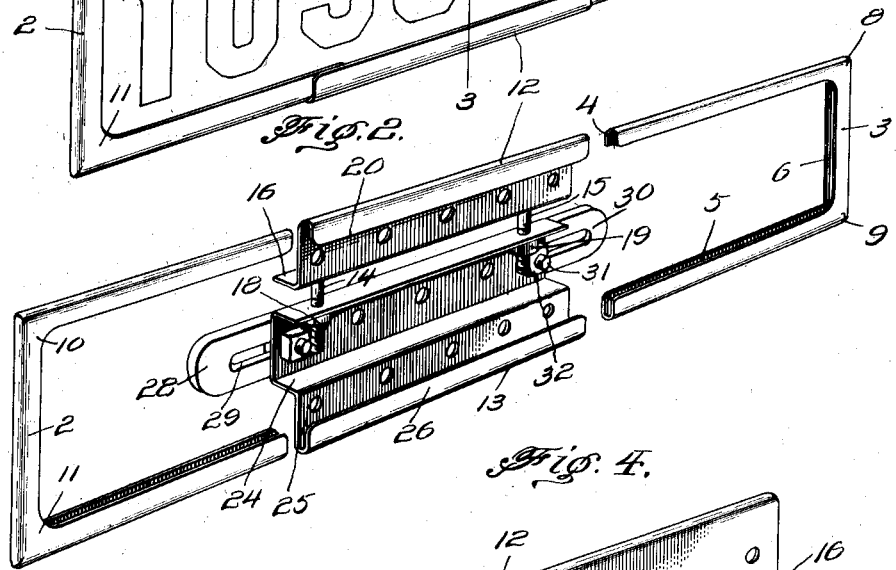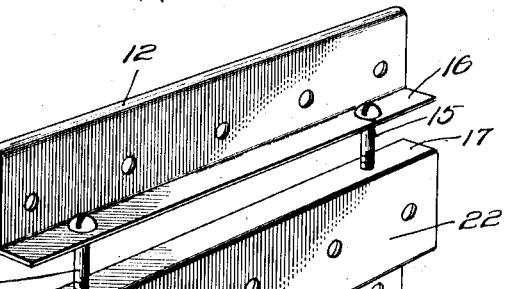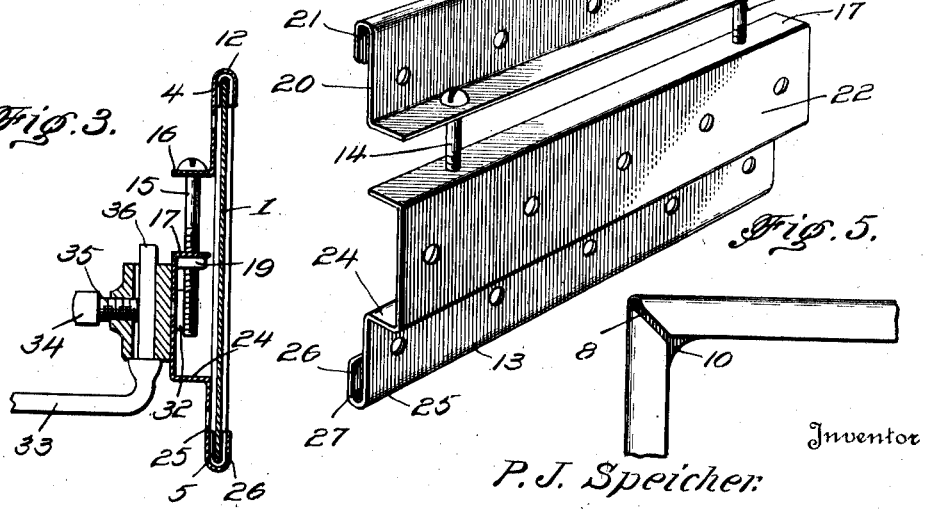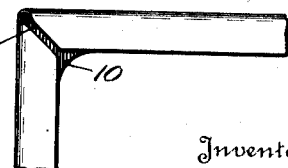

PAUL J. SPEICHER, OF GASTON, INDIANA.

AUTO-LICENSE HOLDER.

1,390,732.     Specification of Letters Patent.    Patented Sept. 13, 1921.

Application filed October 25, 1920. Serial No. 419,270.

*To all whom it may concern:*

Be it known that I, PAUL J. SPEICHER, a citizen of the United States, residing at Gaston, in the county of Delaware and State of Indiana, have invented certain new and useful Improvements in Auto-License Holders, of which the following is a specification.

This invention relates to license plate holders and particularly to that class of holders for adjustably securing metallic license plates such as are issued in the various States.

One of the objects of my invention is the provision of an adjustable license plate holder including protective means whereby the edges of the plate may be protected and at the same time constitute a guide for an adjusting clamp.

Another object of my invention resides in a license plate holder comprising a pair of complementary clamping members and means for adjustably mounting said member with respect to a license plate.

Another object of my invention is directed to an adjustable license plate holder comprising a pair of complementary clamping members and means for transversely adjusting said clamping members with respect to a support.

With these objects in view and others which will be manifest and suggested as the nature and purpose of my invention are revealed in the following specification and drawing wherein I have shown a practical, yet preferred embodiment thereof.

Figure 1 is a view showing the license plate and holder assembled.

Fig. 2 is a front view showing the license plate when removed.

Fig. 3 is a section taken on the line 3—3 of Fig. 1.

Fig. 4 is an enlarged view of the clamp means for the plate.

Fig. 5 is a detail of an end protector.

Numeral 1 designates a common form of rectangular license plate now in general use on automobiles and 2, 3, removable substantially U-shaped integral protecting members adapted to confine and protect the ends and a portion of the top and bottom of the license plate and also act as guides for the clamping elements subsequently to be described. Each of the said end members defines an upper and lower groove 4, 5 and an end groove 6 whereby the plate is securely held therein the corners 8, 9 being cut away as shown in Fig. 5 contiguous to the enlarged front surfaces 10, 11.

An integral top clamping plate 12 and an integral bottom clamping plate 13 are removably and adjustably fastened to each other by a pair of screws 14, 15 passing through alined apertures in the outwardly extending flange 16 of the upper clamping plate and the inwardly extending flange 17 of the lower clamping plate, suitable nuts 18, 19 being screw threaded on the said screws into locking engagement with the under surface of the flange 17 of the lower clamping member. The vertical wall 20 of the top clamping plate is bent upon itself to form a U-shaped groove 21, slightly larger than the groove 4 of the end members so that the same may easily slide therein when it is desired to insert or remove the license plate from the clamping members. The vertical face 22 of the lower clamping plate 13 which also constitutes an attaching surface is bent inwardly as at 24 then downwardly as at 25 and then again upwardly as at 26 to define a U-shaped groove 27 slightly larger than the groove 5 of the end plates in order to slidably receive the same.

It will now be seen that after the end protecting members are placed on the license plate and the screws loosened the plate may be slid in the grooves until it is centered and then the screws tightened to firmly seat the said plate between the clamps. In this manner the entire top and bottom edges and also the ends of the license plate are protected from being broken or mutilated.

A flat plate 28 provided with elongated slots 29, 30 at each end thereof bears against the outer side of the face 22, adjusting bolts and fastening nuts 31, 32 adjustably securing the said lower plate 13 to a suitable bracket or support 33 by a set screw 34 passing through an aperture 35 and bearing against a vertical spindle 36.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

1. In a plate holder of the class described, adjustable, sectional protective end members entirely embracing the ends and a portion of the top and bottom of a plate, an adjustably mounted sectional supporting clamp having opposed, transverse grooves therein for said protective members and said plate, a vertical screw threaded bolt connecting said clamp sections and a locking bolt engaging the lower vertical wall of the clamp for positively locking said clamp sections.

2. In a plate holder of the class described, complementary U-shaped grooved, adjustable protective members entirely embracing the ends and a portion of the top and bottom of a plate, an adjustable, supporting clamp for said protective members and plate, said clamp comprising an upper flange, grooved strap and a lower flanged grooved strap, adjusting elements passing through alined apertures in the opposed flanges of the upper and lower straps, and transversely adjustable means for supporting the clamp and its plate from a vehicle.

In testimony whereof, I affix my signature hereto.

PAUL J. SPEICHER.